United States Patent [19]
Brana et al.

[11] 4,268,967
[45] May 26, 1981

[54] PACKAGE SIZER

[76] Inventors: Lejo C. Brana, 7121 Cecil St., Houston, Tex. 77030; John W. Scott, 1510 Johanna, Houston, Tex. 77055

[21] Appl. No.: 75,426

[22] Filed: Sep. 14, 1979

[51] Int. Cl.³ .............................................. G01B 5/00
[52] U.S. Cl. ...................................... 33/1 V; 33/121; 33/452
[58] Field of Search .......................... 33/1 V, 452, 121

[56] References Cited
U.S. PATENT DOCUMENTS
3,939,564  2/1976  Slawinski ................................ 33/452

*Primary Examiner*—William D. Martin, Jr.
*Attorney, Agent, or Firm*—Browning, Bushman & Zamecki

[57] ABSTRACT

A package sizer comprising a first pair of walls defining a first pair of generally opposed, substantially parallel, planar surfaces. A second pair of walls connected to the first pair defines a second pair of generally opposed, substantially parallel, planar surfaces, the second pair of surfaces being contiguous and perpendicular to the first pair, whereby the four surfaces define a rectangular enclosure. At least one of the walls of each such pair is slidable toward and away from the other wall of that pair to vary the dimensions of the rectangular enclosure.

7 Claims, 3 Drawing Figures

PACKAGE SIZER

BACKGROUND OF THE INVENTION

1. Field of the Invention

The present invention pertains to the sizing of generally rectangular packages. More specifically, the invention pertains to apparatus which may be used to determine the volume and/or dimensions of a generally rectangular package to be used to enclose a number of smaller objects, or to measure the dimensions of a pre-existing rectangular package or object.

2. Description of the Prior Art

Various prior art devices have been designed for the purpose of measuring the dimensions and/or volumes of generally rectangular packages or the like. Examples of such devices are disclosed in U.S. Pat. No. 2,689,082 to Kolisch, U.S. Pat. No. 2,688,878 also to Kolisch, and U.S. Pat. No. 2,736,095 to Krauss. However, these devices are suitable only for measuring the dimensions or volumes of pre-existing boxes or the like and are not useful in determining the size or shape package needed to enclose a given quantity of smaller items. U.S. Pat. No. 3,154,678 to Edwards discloses a device which is capable of either measuring the volume of a given rectangle or measuring the volume of the smallest rectangular solid which could contain a given nonrectangular article. However, the apparatus is again unsuitable for determining the size and shape package needed to enclose a number of smaller objects, such as small loose food items, and involves the use of relatively complicated electronic circuitry.

SUMMARY OF THE INVENTION

Package sizing apparatus according to the present invention comprises a first pair of wall members defining a first pair of generally opposed, substantially parallel, planar wall surfaces. A second pair of wall members is connected to the first pair and defines a second pair of generally opposed, substantially parallel, planar wall surfaces. The second pair of wall surfaces are contiguous and perpendicular to the first pair of wall surfaces, whereby the four wall surfaces together define a rectangular enclosure. At least one of the wall members of each of the pairs is slidable toward and away from the other wall member of that pair to vary the dimensions of the rectangular enclosure.

Accordingly, to determine the volume of a package needed to enclose a given quantity of smaller objects, such objects may be placed in the enclosure and the walls moved inwardly to shorten the dimensions until they abut the goods therebetween. Furthermore, by additional manipulations of the wall members, e.g. moving the movable wall of one pair away from its mate while moving the movable wall of the other pair towards its mate, different configurations of packages of the same basic volume can be simulated. Where the smaller items to be enclosed are themselves relatively large solid containers of substantially uniform size and shape, such as jars or cans, the height of the package in question may be predetermined by the height of such containers, or if several layers of such containers are to be stacked upon one another, the height of the containers multiplied by the number of such layers. Nevertheless, the movable walls may be manipulated as described above so that the person designing the outer, generally rectangular package may experiment with different lengths and widths thereof.

Where the goods to be packaged are smaller and/or more irregular items, such as flexible bag type containers or loose goods such as food stuffs, the height of the overall package may also be more readily variable, and this parameter too can be observed in relation to various lengths and widths by increasing or decreasing the latter two parameters simultaneously. Furthermore, by measuring the lengths and widths of the enclosure with the walls adjusted to firmly abut the items therein, and the height of such goods within that enclosure, it is possible to determine the volume of the package. To facilitate such measuring, at least two of the wall members having perpendicular wall surfaces may be transparent along those surfaces and may be provided with horizontal scale means, also extending along said perpendicular wall surfaces. One of the wall members may also be provided with vertical scale means.

In the preferred form of the invention, the four wall members are separable from one another, and each comprises a plate defining its respective wall surface and connection means integrally adjoining one end of the plate and defining a slideway for receipt of the plate of one of the other wall members. More specifically, the connection means of each wall member comprises a channel body extending perpendicularly from the respective one of the plates and having an open lower end and a closed upper end. The part of the channel body which closes the upper end is preferably disposed no lower than the upper extremity of the adjoining plate. This permits the wall members, if of substantially identical size and shape, to be assembled so that their lower extremities lie in a common plane. Thus, the assemblage may be placed on a level surface such as a table top so that the latter may form the bottom of the enclosure for the goods to be measured.

While the apparatus is especially useful in determining the volume and/or relative dimensions of a generally rectangular package for enclosing a number of smaller items, it can also be used for measuring the dimensions and/or volume of an already existing rectangular package or other object. When not in use, the wall members may be separated from one another, and being identical in size and configuration, may be stacked upon one another for storage in a relatively small space.

Accordingly, it is a principal object of the present invention to provide a package sizing apparatus which defines an enclosure of variable dimensions.

Another object of the present invention is to provide such an apparatus which is relatively simple, and thus economical, in both construction and operation.

Still another object of the present invention is to provide such an apparatus which may be used with a large variety of different types of items to be enclosed.

Yet a further object of the present invention is to provide such an apparatus which may be disassembled for compact storage.

Still other objects, features, and advantages of the present invention will be made apparent by the following detailed description of the preferred embodiments, the drawing, and the claims.

DESCRIPTION OF THE PREFERRED EMBODIMENTS

Figure 1:
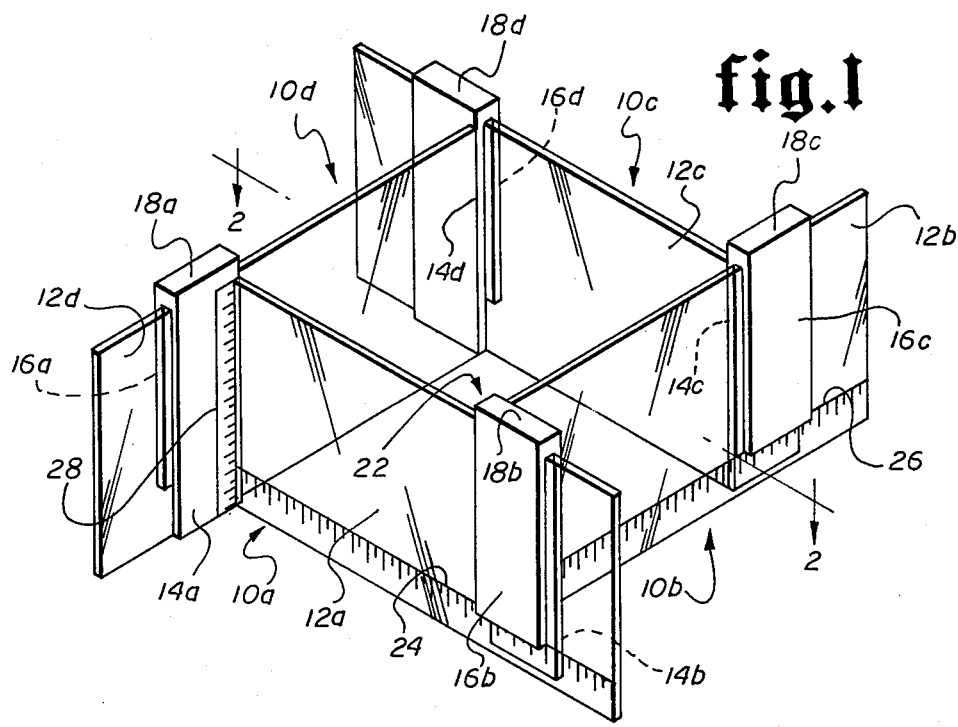
FIG. 1 is a perspective view of a package sizing apparatus according to the present invention.
Figure 2:
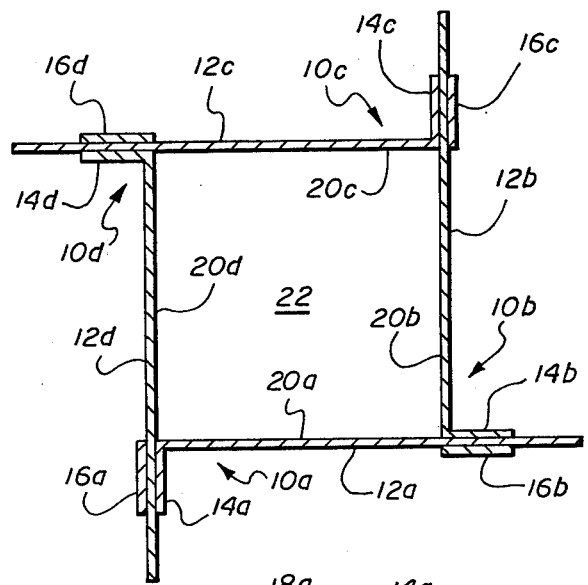
FIG. 2 is a transverse cross-sectional view taken along the line 2—2 in FIG. 1.

Referring to the drawings, there is shown a package sizer comprised of four wall members 10a, 10b, 10c, and 10d. The wall members are virtually identical in size and configuration. Accordingly, like or corresponding parts of the various wall members will be referred to by similar reference numerals suffixed by different reference letters denoting the respective wall member to which the part in question belongs.

Figure 3:
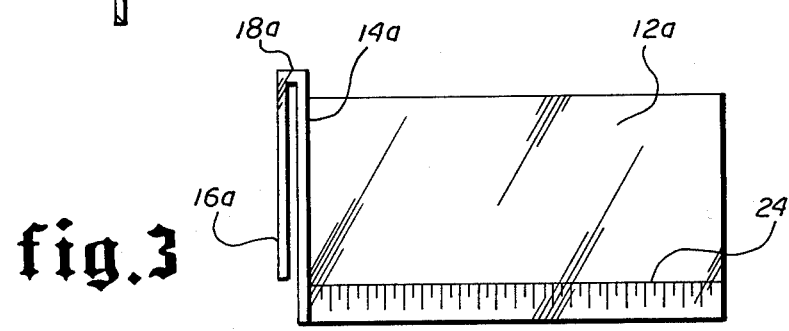
FIG. 3 is an elevational view of one of the wall members of the apparatus of FIG. 1.

Wall member 10a comprises a rectangular plate 12a and connection means in the form of a downwardly opening channel body integrally adjoining one end of said plate. More specifically, the channel body includes a first or inner plate-like side piece 14a extending perpendicularly from the left hand end of plate 12a. A second or outer plate-like side piece 16a is disposed parallel to side piece 14a, the two side pieces being joined to one another in spaced apart relation by an end piece 18a interconnecting their upper edges. Accordingly, the channel formed by pieces 14a, 16a, and 18a has a closed upper end and an open lower end, and runs generally perpendicular to the plate 12a. At this point, it is noted that terms such as "upper," "lower," "vertical," etc. are used herein for convenience and refer to the apparatus as assembled for use as shown in FIG. 1. These terms should not be construed in a limiting sense, since the various parts could be disposed in other orientations when disassembled and/or stored. For reasons to be described more fully below, end piece 18a of the channel body is disposed no lower than the upper extremity of plate 12a, while outer side piece 16a has its lower end disposed upwardly from the lower extremity of plate 12a, all as shown in FIG. 3.

As mentioned, each of the other wall members is substantially identical in configuration to member 10a. Thus, member 10b comprises a rectangular plate 12b and a channel body extending perpendicularly from one end thereof, the channel body being comprised of an inner side piece 14b, an outer side piece 16b, and an upper end piece 18b. Likewise, wall member 10c includes plate 12c having a channel body comprised of side pieces 14c and 16c and end piece 18c extending perpendicularly therefrom. Wall member 10d likewise includes a plate 12d and channel body comprised of pieces 14d, 16d, and 18d.

When assembled, a first pair of the wall members 10a and 10c are arranged with their plates 12a and 12c parallel to each other and with the channel body of each of said members extending generally away from the other member of that pair. Accordingly, surfaces 20a and 20c of plates 12a and 12c respectively form a first pair of generally opposed, substantially parallel, planar wall surfaces. The other pair of wall members 10b and 10d are arranged with their plates 12b and 12d parallel to each other and perpendicular to plates 12a and 12c of the first pair of wall members. Accordingly, surfaces 20b and 20d of plates 12b and 12d respectively define a second pair of generally opposed planar wall surfaces parallel to each other and perpendicular to the first pair of wall surfaces 20a and 20c. Thus, the four wall surfaces 20a, 20b, 20c, and 20d together define a rectangular enclosure 22.

Since the four wall members are substantially identical in configuration, when viewed from the front or outside of the enclosure, each wall member has its respective channel body located at the left hand end of its plate and extending outwardly away from the enclosure 22. Thus, each of the wall members may have its plate slidably disposed in the channel body of one of the wall members of the other pair, and its own channel body slidably receiving the plate of the other wall member of said other pair. More specifically, plate 12a is slidably disposed in channel body 14b, 16b, 18b; plate 12b is slidably disposed in channel body 14c, 16c, 18c; plate 12c is slidably disposed in channel body 14d, 16d, 18d; and plate 12d is slidably disposed in channel body 14a, 16a, 18a. Because the end pieces 18a–18d of the channel bodies are disposed no lower than the upper extremities of the respective plates 12a–12d, the lower extremities of said plates may lie in a common plane defined by a table top or other support on which the apparatus is placed, such support closing off the bottom of enclosure 22.

Because of the sliding interconnections between the wall members, each such member may be moved toward and away from the other member of the respective pair to vary the length and width of enclosure 22. For example, member 10a may be moved toward or away from member 10c, and/or member 10c may be moved toward or away from member 10a by sliding of channel body 14a, 16a, 18a along the engaged plate 12d and sliding of channel 14c, 16c, 18c along the engaged plate 12b. Likewise, the other pair of wall members 10b and 10d may be moved toward and away from each other by sliding of their channel bodies 14b, 16b, 18b and 14d, 16d, 18d along the respective engaged plates 12a and 12c of the other pair of wall members. It can be seen that the plates 12a–12d can be made as long as necessary to allow for the desired maximum dimensions of enclosure 22, while the nature of the sliding interconnections between the wall members will permit such dimensions to be decreased to an effectively infinitessinal degree as the wall surfaces of each pair may be brought into abutment with each other.

Plate 12a has a horizontal scale 24 extending thereacross adjacent the lower extremity thereof. Plate 12b has a similar horizontal scale 26 extending thereacross adjacent its lower extremity. The inner side piece 14a of the channel body of member 10a also has a vertical scale 28 extending therealong immediately adjacent plate 12a. It can be seen that, by use of scale 24 and 26, the length and width of enclosure 22 can be determined, while by use of scale 28, the height of contents within enclosure 22 may be determined.

For simplicity of illustration, horizontal scales have been illustrated on only two of the plates, those plates being perpendicular to each other, and a vertical scale has been shown on the channel body of only one of the two wall members also having a horizontal scale thereon. However, it will be appreciated that both horizontal and vertical scales could be provided on all four of the wall members so that the dimensions of the enclosure 22 and/or the contents thereof could be determined without the necessity of assembling the wall members in any specified order or of viewing the assembled apparatus from any particular side or sides when making such measurements.

Likewise, to facilitate the use of scales 24, 26 and 28, it is preferred that at least plates 12a and 12b be transparent. However, in the preferred embodiment shown, all four of the wall members are entirely comprised of a transparent material, preferably some type of plastic, so that enclosure 22 and its contents may be viewed from any angle or direction. As previously mentioned, the outer side pieces 16a-16d of the respective wall members have their lower ends terminating above the lower extremities of the plates 12a-12d. More specifically, these outer side pieces terminate above the horizontal scales 24 and 26. Thus, side piece 16d terminates just above the adjacent scale 24 so as not to interfere with reading thereof, but so that its edge forms an indicia line to aid in reading the position of plate 12b along the scale 24, and thus, the length of enclosure 22. Likewise, side piece 16c terminates above the adjacent scale 26 so that it will not obscure reading of the scale, but its edge may still be used as an indicia line for cooperation with such scale in determining the width of enclosure 22.

The apparatus of the invention may be used in several different ways. For example where it is desired to design a generally rectangular box or package for enclosing a number of smaller rigid containers of relatively uniform size and shape such as cans or jars, the desired number of such smaller containers may be placed within enclosure 22. Wall members 10a and 10c are then moved toward each other, wall members 10b and 10d also being moved toward each other, until the four wall surfaces 20a-20d compact the containers against one another and abut the containers thus simulating the smallest volume enclosure sufficient to package that number of containers. By reading scales 24 and 26, the length and width of such a package can be determined. Likewise by reading scale 28 with reference to the upper extremities of the enclosed containers, the height of the package can be determined. By multiplying the three dimensions thus measured, the volume of the package is determined.

It may then be desirable to observe other lengths and widths of possible packages of the same volume for enclosing the same number of smaller containers. This can be done by expanding the dimensions of enclosure 22, re-arranging the cans or other containers therein, and once again contracting the opposed pairs of wall members toward each other until they compact and abut the enclosed containers.

A similar use of the apparatus of the invention might be in the sizing of generally rectangular packages for enclosing a given quantity of relatively small, loose, irregularly shaped goods. Examples of such goods might include small flexible bags of cellophane or the like which themselves contain food items, food items per se such as cereals, or powdered or granular materials such as dry detergents. In any case, the desired quantity of such items, which may be determined, for example, by number or weight, is implaced in enclosure 22. The wall members are then contracted toward one another until they abut the enclosed goods. The goods may then be leveled either by hand or with a suitable instrument through the open upper end of enclosure 22, and the volume occupied by such goods may then be determined by reading scales 24, 26, and 28 and multiplying the readings. Additionally, by various manipulations of the wall members toward and away from each other, various shapes or relative dimensions of packages having that volume may be simulated for observation and selection by the package designer. It will be observed that, with relatively small items such as food stuffs or powders, the level of such goods will rise and fall as the lateral dimensions are contracted or expanded so that, after such goods are leveled, they will automatically indicate the necessary package height for any given set of lateral dimensions.

Still another use of the apparatus would be to simply measure the external volume of an already existing package or other rectangular object. In such case, the object would simply be placed within enclosure 22, and opposed wall members moved toward one another until the four sides of the object were in abutment with the wall surfaces 20a-20d. The volume could then be determined by reading scales 24, 26, and 28 as in the preceding examples.

It can be seen from the foregoing description that, while extremely versatile, simple to use, and reliable, the apparatus of the present invention involves no complicated mechanical or electronic equipment. Thus, the apparatus is virtually free from malfunctioning or wear problems and is also relatively inexpensive to manufacture. Also, since the four wall members are separable from one another and identical in configuration, they may be disassembled and stacked upon one another in identical positions or orientations for storage in a relatively small space.

Numerous modifications of the preferred embodiments described above may suggest themselves to those of skill in the art. For example, in the embodiments shown, both wall members of each opposed pair are movable toward and away from each other. However, in other embodiments it may be desirable to make only one wall member of each opposed pair movable toward and away from the other member of that pair. Likewise, for simplicity of illustration, the wall members are shown as monolithic. However, each wall member may be comprised of several pieces integrally affixed to one another, as by a suitable adhesive, or may be comprised of several pieces which may be selectively rigidly adjoined to one another or separated for storage. Still other modifications may be made without departing from the spirit of the invention. Accordingly, it is intended that the scope of the invention be limited only by the claims which follow.

I claim:

1. Package sizing apparatus comprising:
    a first pair of wall members defining a first pair of generally opposed, substantially parallel, planar wall surfaces;
    a second pair of wall members connected to said first pair of wall members and defining a second pair of generally opposed, substantially parallel, planar wall surfaces, said second pair of wall surfaces being contiguous and perpendicular to said first pair of wall surfaces, whereby said wall surfaces define a rectangular enclosure;
    each of said wall members comprising a plate defining said wall surface, and further comprising connection means including a channel body rigidly adjoining one end of said plate and extending perpendicularly therefrom and having an open lower end and a closed upper end defining a slideway for receipt of the plate of one of the other wall members; whereby each of said wall members of each of said pairs is slidable toward and away from the other wall member of that pair to vary the dimensions of said rectangular enclosure.

2. The apparatus of claim 1 wherein said channel body comprises generally parallel inner and outer plate-like side pieces and an end piece interconnecting the upper ends of said side pieces.

3. The apparatus of claim 2 wherein said end piece of each of said channel bodies is disposed no lower than the upper extremity of the respective one of said plates.

4. The apparatus of claim 3 wherein at least two of said plates perpendicular to each other have horizontal scale means extending thereacross adjacent the lower extremity thereof, and the outer side piece of the channel bodies receiving said two plates terminate above said horizontal scale means.

5. The apparatus of claim 4 wherein the inner side pieces of at least one of said channel bodies has vertical scale means extending therealong.

6. The apparatus of claim 5 wherein said vertical scale means is disposed on one of the two wall members comprising said two plates having said horizontal scale means thereon, and is disposed adjacent the respective one of said two plates.

7. The apparatus of claim 6 wherein said two plates are transparent.

* * * * *